United States Patent
Espinoza et al.

(10) Patent No.: US 12,464,085 B2
(45) Date of Patent: Nov. 4, 2025

(54) ADAPTIVE VEHICLE EXPERIENCE PRESENTATION

(71) Applicant: FORD GLOBAL TECHNOLOGIES, LLC, Dearborn, MI (US)

(72) Inventors: Jesus Espinoza, Cuernavaca (MX); Alejandro Jonathan Lopez, Cuautitlan Izcalli (MX); Oscar Ussiel Martinez, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 309 days.

(21) Appl. No.: 17/837,154

(22) Filed: Jun. 10, 2022

(65) Prior Publication Data

US 2023/0403369 A1    Dec. 14, 2023

(51) Int. Cl.
| | |
|---|---|
| *H04N 5/91* | (2006.01) |
| *B60K 35/22* | (2024.01) |
| *B60K 35/25* | (2024.01) |
| *B60K 35/26* | (2024.01) |
| *H04N 21/414* | (2011.01) |

(52) U.S. Cl.
CPC .................... *H04N 5/91* (2013.01)

(58) Field of Classification Search
None
See application file for complete search history.

(56) References Cited

U.S. PATENT DOCUMENTS

| | | | |
|---|---|---|---|
| 7,617,276 B2 | 11/2009 | Bui | |
| 10,565,625 B2 | 2/2020 | Doughty et al. | |
| 11,127,048 B2 | 9/2021 | Publicover et al. | |
| 2004/0143624 A1* | 7/2004 | Kusano | H04L 67/52 709/201 |
| 2007/0242836 A1* | 10/2007 | Basir | H04L 67/02 381/86 |
| 2011/0185279 A1 | 7/2011 | Ingkavet | |
| 2013/0023308 A1* | 1/2013 | Tsai | H04M 1/0202 455/558 |
| 2014/0031084 A1 | 1/2014 | Johnson, Jr. | |
| 2014/0244401 A1 | 8/2014 | Doughty et al. | |
| 2017/0129335 A1* | 5/2017 | Lu | G16H 70/00 |
| 2019/0130450 A1 | 5/2019 | Lamont | |
| 2019/0391580 A1* | 12/2019 | Di Cairano | G06N 5/022 |
| 2020/0062275 A1* | 2/2020 | Higgins | G05D 1/0061 |
| 2020/0349610 A1 | 11/2020 | Publicover et al. | |
| 2022/0107798 A1* | 4/2022 | Takatsuna | G06F 8/65 |
| 2023/0073436 A1* | 3/2023 | Kent | B60Q 3/80 |

* cited by examiner

*Primary Examiner* — Hung Q Dang
(74) *Attorney, Agent, or Firm* — Joseph Zane; Brooks Kushman P.C.

(57) ABSTRACT

A vehicle receives a vehicle data package including instructions for use of one or more vehicle outputs to behave in a preconfigured manner, indicated in the data package, based on the occurrence of a trigger condition, also included in the data package. The vehicle monitors at least temporal or vehicle states corresponding to the trigger condition until state values indicate occurrence of the trigger conditions and, responsive to occurrence of the trigger condition, automatically utilizes the one or more vehicle outputs to output a coordinated sequence of events indicated in the data package.

4 Claims, 3 Drawing Sheets

ADAPTIVE VEHICLE EXPERIENCE PRESENTATION

TECHNICAL FIELD

The illustrative embodiments generally relate to an adaptive vehicle experience presentation.

BACKGROUND

We live in a world of multi-media experience, and an automotive vehicle is a mobile suite of infotainment tools. With active navigation, vivid displays, and high quality sound outputs, the vehicle can deliver a multi-media presentation comparable to many in-home entertainment systems. Further, with controlled environmental conditions, the vehicle can add a further sense-based experience to a presentation that is hard to capture in a larger environment.

Social media and comparable tools have given us the ability to remember virtually any date. While users used to have to set calendar reminders, many social media sites will now issue reminders about birthdays, anniversaries, work anniversaries, etc. These reminders often come with canned responses provided therewith, that allow a user to click "respond" and generate a friendly, but relatively impersonal, congratulations message.

While such messages are fine for casual contacts, they often lack a level of personalization that reflects any active thoughtfulness. Moreover, they are often one-dimensional (i.e., text only) emails that contain nothing more than a message. Even when a user customizes the response message, it frequently lacks evidence of significant care in crafting.

Accordingly, people still tend to rely on conventional gifts for meaningful moments. These usually include cards, flowers, candy, presents, etc. But, when a relevant day falls on a weekday, the intended recipient may be difficult to reach, and the gift may not be delivered until day's end, or a next-day, and the gift is further prone to loss if one attempts to deliver it to a busy place of work, without any assurances it will reach the intended recipient.

SUMMARY

In a first illustrative embodiment, a vehicle includes one or more processors configured to receive a vehicle data package including instructions for use of one or more vehicle outputs to behave in a preconfigured manner, indicated in the data package, based on the occurrence of a trigger condition, also included in the data package. The one or more processors are also configured to monitor at least temporal or vehicle states corresponding to the trigger condition until state values indicate occurrence of the trigger conditions and, responsive to occurrence of the trigger condition, automatically utilize the one or more vehicle outputs to output a coordinated sequence of events indicated in the data package.

In a second illustrative embodiment, a vehicle includes one or more processors configured to receive a vehicle data package including one or more trigger conditions, indication of one or more outputs to be controlled responsive to occurrence of the one or more trigger conditions, and one or more media files to be replayed through at least one of the one or more outputs controlled responsive to the trigger conditions and designated for replay of the one or more media files. The one or more processors are also configured to determine that the vehicle is in a state indicating occurrence of the one or more trigger conditions and, responsive to the vehicle being in the state, automatically utilizing the indicated one or more outputs in a manner defined by the data package, including at least replay of the one or more media files through the designated one or more outputs.

In a third illustrative embodiment, a method includes receiving indication of one or more media files to be included in a vehicle output sequence. The method further includes uploading the indicated one or more media files. The method also includes receiving indication of one or more vehicle outputs to be utilized to output the one or more media files, including correlation of a given of the one or more media files to a given of the one or more vehicle outputs. Further, the method includes receiving one or more trigger condition values for triggering replay of the one or more media files using the one or more vehicle outputs, receiving designation of a vehicle, and creating a data package for the designated vehicle, including the one or more media files and instructions to use the indicated one or more vehicle outputs to replay the one or more media files based on the correlation and upon occurrence of the trigger condition values as indicated by one or more detectable vehicle states.

DETAILED DESCRIPTION

Figure 1:
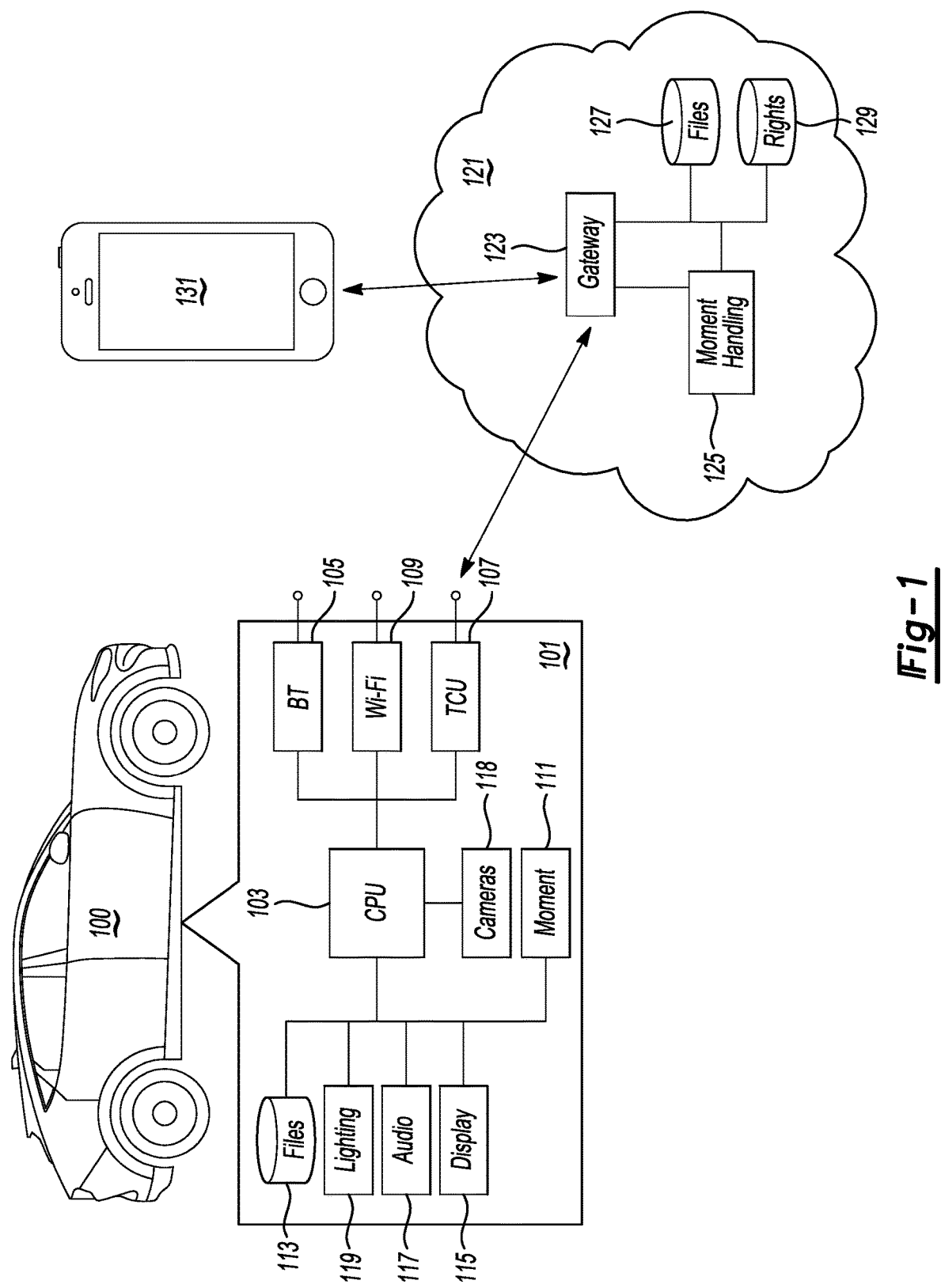
FIG. 1 shows an illustrative example of a vehicle computing system for experience presentation.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

One nice aspect of vehicle infotainment is that there is a captive audience. While the driver will still be watching the road, there are opportunities for media presentation at stop lights, intermittent stops, and journey origins and destinations. Further, the vehicle may include one or more large LED displays, capable surround sound speakers, and even an opportunity to create a sense-based environment through HVAC control and/or haptic feedback. Moreover, with autonomous or semi-autonomous vehicles, destinations can be added and automatically engaged, which will also be discussed in the contexts herein.

The illustrative embodiments propose the use of a vehicle infotainment environment to present customized messaging for important events, such as birthdays, anniversaries, holidays, etc. The digital immersive vehicle environment can be used to deliver visual messages, audio messages, sense-based messages (e.g., ski-trip invitation with a blast of cold air, flashing or color-coordinated interior lighting effects, etc.), digital gifts (e.g., a congratulatory message with a free fuel refill or other vehicle-redeemable coupon), surprise navigation instructions (user-based or autonomous navigation to a surprise destination related to an event), etc.

Instead of simply sending a nice text or email, a user can fully customize a message with a variety of aspects and the vehicle can determine an appropriate delivery time and present an immersive and thoughtful vehicle experience. The vehicle can even record user reactions and provide immediate and direct communication between the gift-giver and the recipient. Illustrative experiences will be described herein, by way of example and not limitation.

FIG. 1 shows an illustrative example of a vehicle computing system for experience presentation. In this example, the vehicle 100 includes an onboard computing system 101 that has one or more processors 103. The vehicle computing system also includes, for example, a number of communication transceivers, which can enable short range, mid-range and long-range communication. For example, the vehicle 100 may include a BLUETOOTH transceiver 105, which can pair with a user device and which may also be usable to pair with a gift-giver device upon arrival at a destination.

For example, if a user was routed to a surprise destination, as will be discussed herein, the gift-giver device could be notified of arrival and this could establish custom control through the remote device and/or custom communication or messaging. E.g., when the vehicle arrives, the vehicle 100 could pair with a remote device 131 and the gift-giver could say (through the vehicle speakers)—"Happy Birthday!" or "Please come inside through the side door for your surprise." The user may even lock a present in a trunk or other lockable vehicle compartment (that will not interfere with driver needs) and the pairing could allow for popping the trunk and delivery of a message like "look inside the trunk for your graduation present!"

A telematics control unit (TCU) 107 can provide longer-range communication and comparable communication capability. This may allow for some instruction at the onset of an unplanned journey, such as presenting the digital moment and then allowing a remote user to deliver a cryptic message such as "now, please sit back and enjoy the ride as the vehicle drives you to a surprise location," or "please follow the instructions that are being provided, there is a special Anniversary surprise waiting for you." The navigation instructions could also be tailored so that an eventual destination is not revealed until a last moment, so as to preserve a surprise. The user could be provided with a button for revealing the destination if necessary for navigation purposes (e.g., traffic or construction), but the system could at least attempt to preserve the surprise.

A Wi-Fi transceiver 109 can also be used in a similar capacity to the communication connections above. Further, if significant media were uploaded to the vehicle 100, as discussed later herein, the Wi-Fi transceiver could be used when the vehicle 100 is parked at a home location to facilitate media upload without excessive bandwidth usage while the vehicle 100 is traveling. Connection to a common network may also serve as some form of credentialing, proving the vehicle 100 has obtained the message and experience through an approved connection.

When a predefined media package is ready for delivery, a moments delivery process 111 onboard the vehicle 100 can ensure availability of both driver and necessary vehicle outputs, and deliver the tailored moment experience. This can include loading media and other files from an onboard storage of media for the moment 113. This media may have been uploaded at a prior point in time, to ensure it is onboard the vehicle 100 for delivery and that buffering and/or connectivity loss do not ruin the moment or otherwise interrupt the presentation. If certain media cannot be saved long-term based on licensing, the moments process may have the right to stream the media prior to the moment and capture it momentarily onboard for later delivery, provided it deletes the media once replayed.

Vehicle displays 115, audio outputs 117, interior lighting 119 and other systems can be used to enhance the moment with visuals, sound, environmental changes, etc. Moments relating to cold can be accompanied by air conditioning, moments related to heat by heating. Haptic feedback can be used for a touch-based enhancement when possible. Many user senses can be engaged through the vehicle 100, and the delivery of the moment can create a thoughtful and well-presented user experience.

A cloud-based remote system 121 can include a gateway 123 for handling requests. If the system is provided by an original equipment manufacturer (OEM) for example, thousands of varied requests may flow through the cloud every minute. The gateway can route the requests appropriately, which in this instance, can include a moment handling process 125. Since a moment will often be crafted remote from a vehicle 100, by, for example a user using a computer or computing device 131, the cloud 121 system may handle obtainment of media files, packaging of the moment, and crafting instructions for the vehicle computing system 101 to deliver the moment in a certain manner under certain circumstances based on certain triggers and in a certain sequence. Media files related to the moment may be stored, permanently or temporarily, in the cloud at 127, and some user rights or permissions related to the media files or other obtainable files may also be stored at 129. For example, a user may have a streaming music and video account, from which video and music is to be drawn for the moment, but the user may lack rights to permanently keep those files. Instead of storing the file, then, the process may store evidence of the rights, and the files can be obtained shortly before moment replay in the vehicle 100, to prevent slow buffering but still to protect the rights. Right to momentarily store the files can be covered by buffering permissions associated with the file and/or negotiated with a file-provider.

Figure 2:
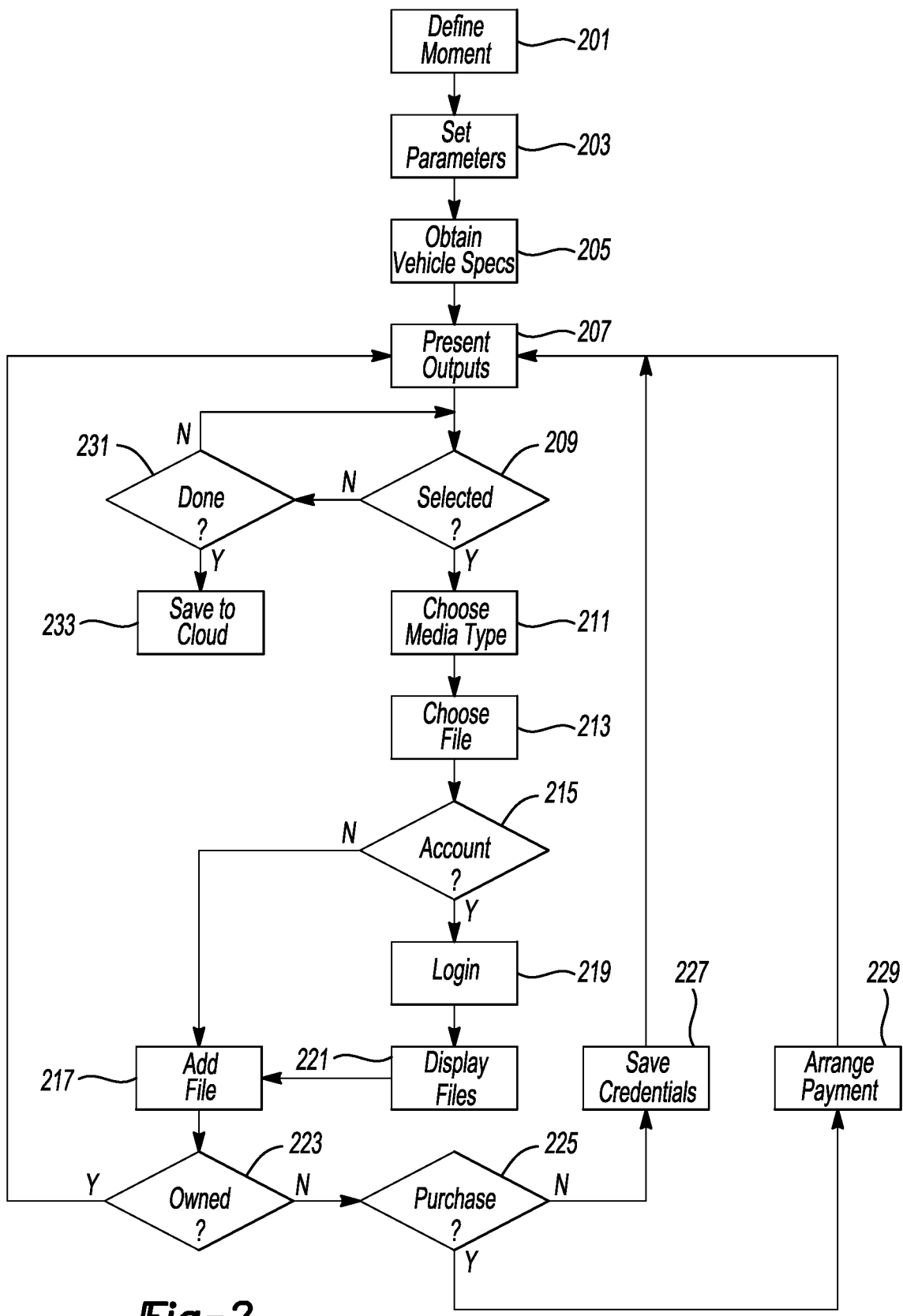
FIG. 2 shows an illustrative experience configuration process.

FIG. 2 shows an illustrative experience configuration process. In this example, the user can input a moment, which is typically a calendar-type event with an applicable date and/or date and time. For example, birthdays, anniversaries, graduations, retirements, special holidays (mother's/father's day, etc.). The dates can be personal (familial) or professional—a boss could submit a moment for Administrative Professional's day, for example, provided that the gift-granter had permission to access the vehicle of the recipient.

Since the replayed moment will occur in the vehicle of the recipient, the gift-granter may need some form of permission to access the vehicle. This can come in the form of a one-time code or passcode, or the request to configure the moment can come from a device already approved in the vehicle. Of course, when the recipient is not a family member, this could be more difficult, but a motivated boss could work with another family member (e.g., a spouse of the recipient) to obtain appropriate access and still keep the gift a secret. Or the boss could ask for access and let the person know that the moment was coming, but the moment itself could still be a surprise.

Since moments can include digitally redeemable coupons and payments, the boss could give the administrative professional, for example, a free tank of gas and a free lunch at a business that could accept payments from a vehicle. Then the vehicle could negotiate the payment for gas and lunch, and charge a payment form belonging to the boss, or the boss could deposit some amount of money in a vehicle wallet for the intended purpose, although it could be ultimately used for whatever the recipient desires. In a similar manner, people can give significant others monetary or monetary equivalent gifts, and either the vehicle, or an application residing on the phone and connected to a vehicle wallet, can be used to pay for the corresponding goods or services.

The moment itself is often less about any monetary present and more about the in-vehicle experience—and a reason why there may need to be permissioning to set up a moment for someone else driving a vehicle, to prevent any abuse of the system. Assuming that the gift-granter (giftor) has permission to access a specified vehicle for the moment, or that permission can be arranged through conventional methods, the process can continue.

Initially the giftor may specify some number of trigger parameters at 203. This can include, for example, a trigger date, a trigger time or time range, a trigger location, etc. For example, if the moment was nice message without any change in travel plans, then the message may be set to trigger on the morning of the event when the vehicle was started while parked at home. That way, whenever the recipient left the house, the event would trigger. On the other hand, if the message include navigation instructions to a nice dinner or some event that required a time-investment, the message may not trigger until the vehicle was parked at work and started some time after, for example, 4 PM. The user could put another message for delivery in the AM, as a teaser, so that in the morning the user could say "Happy Birthday, please be sure to leave work on time today for a surprise!" and then in the evening a more engaging message with directions to a dinner location could be presented when the trigger variables were met.

The process can also obtain vehicle specifications for a specified vehicle at 205, which can include available outputs, lighting, feedbacks, configurable systems, etc. The process may also require a method to identify a vehicle, if the user does not have an application already directly paired with a vehicle—this could include a one-time code usable with a one-time password so that, for example, a boyfriend could obtain permission for and identification for a one-time event for a girlfriend's vehicle, even if the boyfriend did not have general access to the vehicle through an application on a phone. Again, this may spoil a bit of surprise, but the security may also be deemed necessary so that access does not perpetuate if the couple breaks apart. Accordingly, depending on security desires, security concerns may override a desire for absolute surprise.

Once the vehicle has been identified and the specifications have been obtained at 205, the user may be presented with a list of configurable vehicle systems, such as outputs, at 207. In a limited example, this could include, for example, a single display, a single speaker system and a single interior LED lighting system with color changing options.

The user can select each system at 209 until there are no more systems desired to be configured at 231. Selection of a display, for example, can provide an opportunity to choose between video and static display media at 211. The video media may also have audio media for application to a speaker output, or the audio media can be selected separately (e.g., a song or message). The user can select or designate a media file at 213.

If the media file, such as an image, video or song is stored on the user device used to configure the moment, the user can directly select the file at 217 for inclusion in the package and upload to the cloud and eventually to the vehicle 100. In other instances, the user may want to use a streaming account or social media account to select a licensed file or previously saved memory. In either event, the user may notify the configuration application that a linked account is being used at 215 and provide login credentials for the account at 219. The configuration file may save the credentials until the moment has passed, since some media files will require continued subscription to and through the point of replay in order to access music that is not directly purchased.

In other examples, the login may be discarded after use, for example, when a social media account is used to recover a picture or video that the user already owns. Once login is completed, the user can view a list of files associated with the account, or select or search for a file at 221 to select the appropriate file for replay.

As a file is added to the package at 217, the process can determine if the file is owned or obtained under subscription at 223. If the file is already owned, then the process can add the file to the package and move on with configuration. If the file is not owned, the process may give the user an option to purchase the file permanently or for one-time use at 225, to prevent any issues with replay when the event occurs. For example, if a user is using a music file under license and cancels a subscription, the user may no longer have permission to replay that file. Thus, the system may not have permission to replay the file, and therefore the event may only partially work. If the user wants to purchase the file at 229, the system can negotiate obtaining the relevant rights at 229 and ensure the file can be used as desired. Otherwise, the system can just save the relevant credentials at 227 for proving license to use the file, and the onus is ultimately on the user to ensure the account subscription is maintained until the moment has passed.

Once a user has completed configuring all outputs—e.g., display to show an engagement photo, audio to play a wedding song, lighting to change to wedding theme colors—for an anniversary moment—the system can save the configuration to the cloud, along with the appropriate media files, to be pushed to the vehicle 100 when the vehicle is available.

Figure 3:
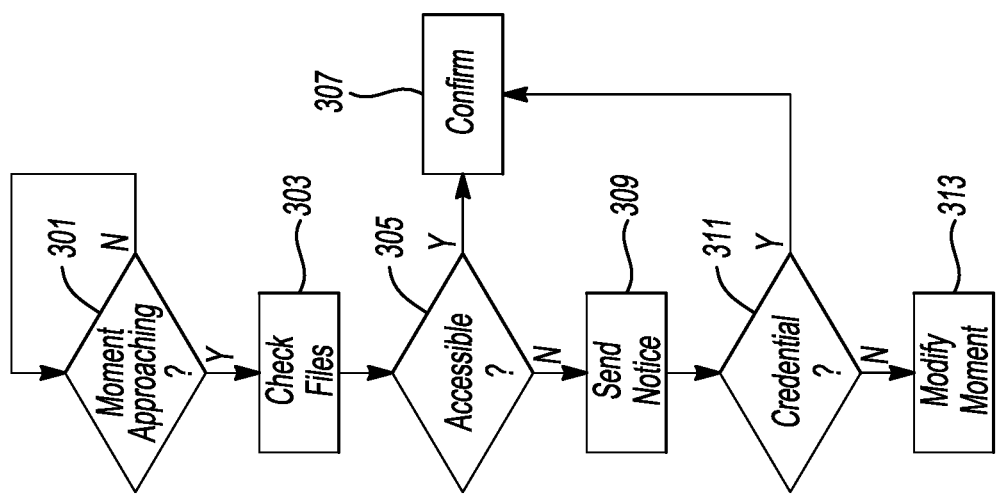
FIG. 3 shows an illustrative experience analysis process.

FIG. 3 shows an illustrative experience analysis process. This is a process that may execute just prior to a moment (e.g., a day, a few days, a week before, etc.) to ensure that the moment can be replayed without any file corruption or loss of media rights. This process may help prevent a user's moment being spoiled due to a corrupt file and/or lost media rights.

The user can configure a reminder and/or the system may have an automatic check built in, and when the moment is within a timing threshold of occurring (e.g., 3 days) at 301, the process can run a check on all the relevant files to ensure they are not corrupted at 303. This can include comparing onboard files to cloud stored files, running corruption checks and ensuring that any licensed media is still under license. This can include an attempt to replay video without error, a review of images for corrupted pixels, etc. This may also involve replay of the full moment on a vehicle preview screen on a user device if necessary, so the user can confirm the moment appears as the user intended.

Provided that all the files are present, licensed when necessary with appropriate credentials, and seemingly functional at 305, the process can confirm the moment at 307 and set it for output. While corruption or loss of license could still occur, this verification process will hopefully prevent such incidents, and allow users to configure moments months in advance. This may also verify that anyone providing a moment to a vehicle still has permission to do so, to prevent, for example, a recurring anniversary moment from being replayed in a vehicle that had been sold to someone else.

If there are any issues with the vehicle access or files at 305, the process can notify a user at 309 and request updated files or credentials at 311. This can include new login information for a media account or vehicle access permissions, re-uploading a corrupted file, refreshing an account or purchasing media associated with a lapsed account, or even designating a new vehicle if the old vehicle had been sold. If the user cannot "correct" the issues identified with the moment, the user may be given an opportunity to modify the moment at 313, which can include choosing new media or providing alternative credentials for a different media account or fixing other issues in a way that changes the output.

Figure 4:
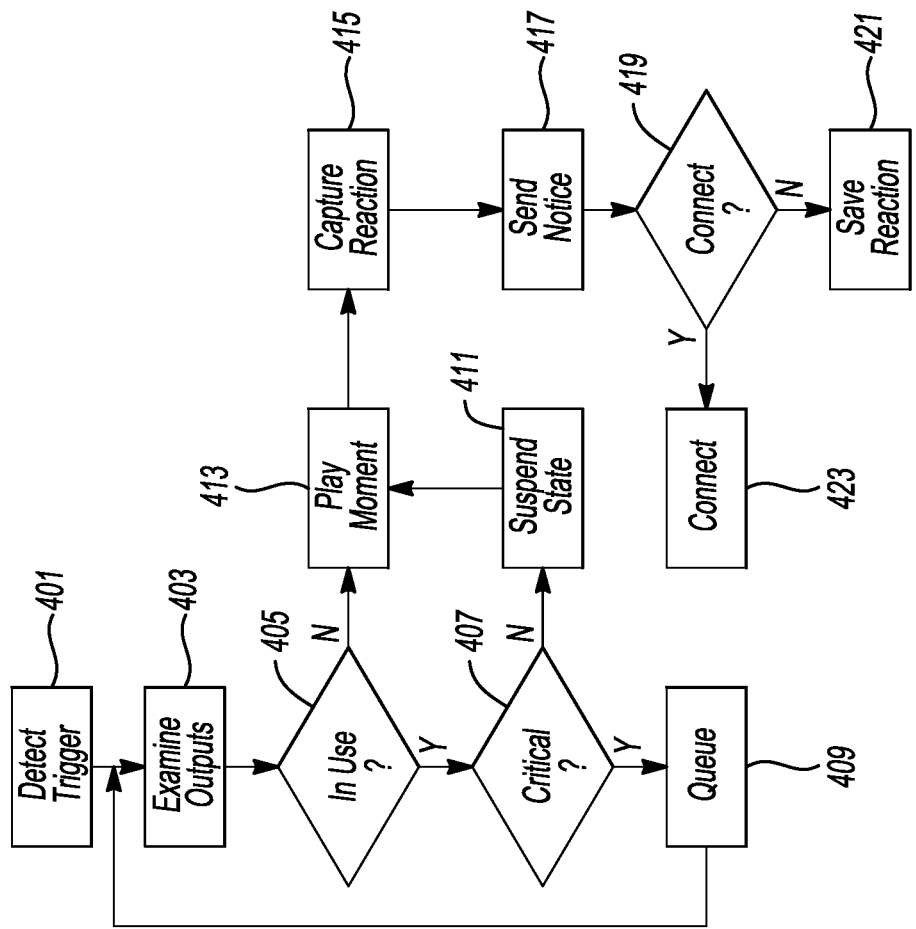
FIG. 4 shows an illustrative process for experience presentation.

FIG. 4 shows an illustrative process for experience presentation. In this example, the vehicle 100 detects that trigger conditions are met at 401. Triggers can include a day of week, date, time, location or even specific user being present, if user-detection is enabled in a vehicle. User detection can include visual identification of a user or the presence of a user device. In one example, the moment may be loadable onto a user device, with all the media, and the device itself can trigger the moment when present in the vehicle on the correct day. This allows for presentation of moments in a vehicle that may lack cloud-connectivity, but which includes device connectivity—the device can serve as the repository for the moment and perform the trigger handling, and in that model the giftor would need to have permission to access the device, potentially, as opposed to the vehicle, since the device would already be paired with the vehicle, as it would typically be the device belonging to the recipient of the moment. This could also allow for a "portable" moment, in the sense that, if a user carpooled for example, the moment could be replayed in someone else's vehicle (if the device were paired and the vehicle included the corresponding outputs)—an example of this would be four friends who carpooled to school each day, each friend may have their devices paired to the other friends' vehicles, and a parent could load the moment onto a child's device to be replayed regardless of which vehicle was driven.

When the trigger is detected at 401, and the conditions are met, the process may also examine requested outputs at 403. When outputs are specified based on a known vehicle, for example, those outputs are likely to be present, but not always likely to be available—for example, HVAC may be used to warm or cool a car, a display may be being used to select a radio station or input navigation, audio outputs may be used for music or a phone call, etc.

If none of the outputs are in use at 405, the moment can be replayed at 413, which will be discussed in more detail below. If any outputs are in use at 405, the process may determine if that use is critical or not at 407. Critical use may be user-specified and certain categories may be pre-classified as critical (e.g. emergency calls, use of HVAC at extreme interior temperatures, etc.). Other uses, such as tuning a radio, may be deemed non-critical and permissible for override. If any use is classified as critical, the process may queue the moment at 409 until critical uses are terminated.

If the uses are override permissible at 407, the process may take a state snapshot at 411 of the outputs to allow resumption of tasks when the moment is complete. This may not always work (e.g., speakers for radio replay, it may be difficult to resume radio replay at the prior point in time), but generally can be used when appropriate—e.g., a user is halfway through entering directions into navigation, and that state may be resumable after the moment.

The moment can then be played at 413, which can include tuning vehicle lighting, changing settings, playing a video, displaying an image, playing audio, etc. The audio or video could even include a direct connection to the giftor for a personal and live video or message, or replay of pre-recorded files as previously noted.

Vehicle cameras and microphones can be used at 415 to capture a reaction to a moment for recordation and playback to a giftor with permission of the recipient. This allows the giftor to see the effect their moment made on the recipient. The vehicle 100 may also send a notice when the moment had been played at 417, to the giftor, and this can include the reaction when permitted.

The process may further give an option to provide a direct connection to the giftor at 419, for an immediate thank-you or response at 423. Otherwise, the vehicle 100 can save the reaction for later replay at 421.

In some instances, the moment may include digitally redeemable gifts and/or navigation outputs. These can be configured and obtained when the moment is configured and suppression of portions of directions, for example, can also be configured.

So, for example, if a user had to travel 30 miles to a destination, the process could suppress the last ¼ mile, so that the exact destination was a mystery, but so the user could take alternative routes as needed. In an autonomous vehicle, where the vehicle could drive itself to the event, the directions may be obscured completely.

Ultimately, the user may always be able to override the suppression if desired, through use of an input instructing override, for example, but if they can resist that temptation then the surprise can be preserved. Digitally redeemable gifts can be presented as messages indicating the quantity of the gift and redemption locations, as well as directions for travel when desired.

So, for example, a birthday gift may include a morning message with a digitally redeemable massage gift for lunch, which includes directions to a spa and instructions to redeem the gift. Then, in the evening, the vehicle can provide suppressed directions to a dinner location with another message, so the user can partially navigate to the location and/or be driven by an autonomous vehicle. These messages can leverage any configurable vehicle system that makes the experience more interesting, which can include changing lights, changing displays, etc. The triggers for messages can also be tiered, so that, for example, a first message is played upon entry, and different messages are played as points are reached or times of day are reached. This allows for the crafting of a continual user experience.

Themes and preconfigured messages may also be stored in the server and accessible through an interface. These templates may provide some general configuration settings (e.g. backgrounds, recommended songs, etc.) and then a user may be able to customize aspects of the templates.

In the examples and the like, the vehicle experience can be repurposed for a powerful and thoughtful engine for giving an immersive moment to a driver or occupant as a gift, which can leverage the combination of vehicle systems in an interesting and unique manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method comprising:
   receiving indication of one or more media files to be included in a vehicle output sequence;
   uploading the indicated one or more media files;
   receiving designation of a vehicle;
   obtaining vehicle's specifications based on the received designation of the vehicle;
   presenting outputs to be utilized based on the obtained vehicle's specifications;
   receiving indication, among the presented outputs, of one or more vehicle outputs to be utilized to output the one or more media files, including correlation of a given of the one or more media files to a given of the one or more vehicle outputs;
   receiving one or more trigger condition values for triggering replay of the one or more media files using the one or more vehicle outputs;
   and
   creating a data package for the designated vehicle, including the one or more media files and instructions to use the indicated one or more vehicle outputs to replay the one or more media files based on the correlation and upon occurrence of the trigger condition values as indicated by one or more detectable vehicle states.

2. The method of claim 1, further including pushing the package to the designated vehicle for storage when the designated vehicle is available for communication.

3. The method of claim 2, further comprising verifying a permission, of a user from whom the indication of the one or more media files and one or more outputs was received, to utilize the designated vehicle prior to pushing the package.

4. The method of claim 1, further comprising:
   obtaining specific vehicle outputs corresponding to the designated vehicle; and
   presenting the outputs on a user interface for use in selecting the received indication of the one or more vehicle outputs.

* * * * *